United States Patent Office 3,692,732
Patented Sept. 19, 1972

3,692,732
CURABLE POLYORGANOSILOXANE ELASTOMERS AND PROCESS FOR CURING SAME
Bruno Degen, Schildgen, Heinz Goller, Cologne, Wilfried Kniege, Bergisch-Gladbach, Walter Noll, Opladen, and Werner Buchner, Leichlingen, Germany (all c/o Farbenfabriken Bayer AG, Leverkusen, Germany)
No Drawing. Filed Mar. 26, 1971, Ser. No. 128,573
Claims priority, application Germany, Apr. 1, 1970,
P 20 15 402.3
Int. Cl. C08g 51/04
U.S. Cl. 260—37 SB   12 Claims

ABSTRACT OF THE DISCLOSURE

The present invention relates to a process for the production of an improved polyorganosiloxane composition convertible by heating to the solid elastic state wherein cerium carbonate is admixed with the polyorgano-siloxane in order to reduce the curing time thereof and in order to increase the thermal stability of the cured elastomer.

---

This invention relates to elastomers based on polyorganosiloxanes, and is especially concerned with improving the vulcanisation and thermal stability properties of such elastomers.

In comparison with purely organic elastomers, polyorganosiloxane-based elastomers are essentially characterised by their thermal stability. If, however, silicone elastomers are exposed to elevated temperatures for a prolonged period of time, hardening and brittleness can also be observed in this class of substances, increasing with temperature and time and attributable to progressive cross-linking.

Numerous proposals have already been made in order to obviate, or at least reduce, this hardening and brittleness. It has been proposed, for example, to incorporate into the elastomer iron oxide, but this gives rise to an intense coloration of the elastomer stabilised therewith and therefore strongly restricts the range of application of the elastomer. According to another proposal it is also possible to use organic cerium compounds, primarily cerium salts of carboxylic acids, as stabilisers. However, apart from the expensive production of such compounds, the inevitable dark coloration of the elastomers under thermal stress, due to decomposition of the organic components, is a considerable disadvantage.

The addition to the elastomers of chlorides or acetates of rare earths is recommended in German published specification No. 1,164,087. According to the examples in that specification, aqueous solutions of these salts are used. However, the addition of water very adversely affects the technical properties of the elastomers. The use of oxides of rare earths as thermal stabilisers for polyorganosiloxane elastomers has also already been proposed (cf. German published specifications Nos. 1,109,368 and 1,242-866).

According to the present invention a process for improving the vulcanisation properties and thermal stability of elastomers based on polyorganosiloxanes comprises incorporating in the elastomer from 0.001 to 10 parts by weight of cerium carbonate for every 100 parts by weight of polyorganosiloxane.

Surprisingly, it has been found that cerium carbonate has a particularly effective thermostabilising influence on polyorganosiloxanes and on the elastomers produced therefrom and that it also surpasses in this respect cerium dioxide and the other cerium salts already proposed as thermal stabilisers. The disadvantages of other known stabilisers, such as discoloration or the introduction of water into the polymer mixture, are not encountered with the addition of cerium carbonate. The thermostabilising effect is clearly recognisable, especially by the constancy of the hardness and tear propagation resistance of the vulcanisation products.

Cerium carbonate also has the advantage that it is capable of substantially improving the vulcanisation properties of polyorganosiloxanes during cross-linking with peroxides. Other substances which may be used to give a higher thermal stability of the polyorganosiloxanes do not have this capability to the same extent. This improvement manifests itself, inter alia, by an increase of the vulcanisation speed and by a reduced persistent compression set which, obviously, also means an improvement of the mechanical properties.

The polyorganosiloxanes used in the elastomers normally contain between 1.98 and 2.02 organic radicals or hydrogen atoms per silicon atom. The organic radicals can be any monovalent hydrocarbon radical which may be halogenated or may contain cyano groups, and examples are methyl, chloromethyl, ethyl, cyanoethyl, propyl, cyanopropyl, 3,3,3-trifluoropropyl, isopropyl, n-butyl, tert.-butyl, phenyl, chlorophenyl, perchlorophenyl, tolyl, xylyl, benzyl, phenylethyl, naphthyl, anthryl, cyclopentyl cyclohexyl, cyclooctyl, vinyl, allyl, styryl, cyclohexenyl and cycloheptadienyl. The terminal groups of the polyorganosiloxanes may be hydroxyl, alkoxyl, aroxyl, trialkyl-, dialkylhydrogen-, dialkylaryl-, alkyldiaryl-, diarylhydrogen-, triaryl-, dialkylalkenyl-, alkyldialkenyl-, trialkenyl-, diarylalkenyl- and aryldialkenyl-silyl groups as well as the corresponding halogenated or cyano group-containing substituents.

The polymers under consideration which have a viscosity of at least 10 cp. (at 20° C.) are prepared according to known condensation or polymerisation processes. The cross-linking of polyorganosiloxanes to produce elastic and hardened materials (vulcanisation) can be carried out by means of cross-linking agents, such as e.g. peroxide. Suitable cross-linking agents for hot vulcanising mixtures are, for example, peroxides such as dibenzoyl peroxide, di-p-chlorobenzoyl peroxide, bis-(2,4-dichlorobenzoyl) peroxide, dicumyl peroxide, di-tert.-butyl peroxide, tert.-butyl perbenzoate and tert.-butyl peracetate.

However, it should be noted that the present invention is not restricted to hot vulcanised elastomers. The thermal stability of cold cross-linked products is also substantially improved by the incorporation therein, according to the invention, of cerium carbonate.

The organosiloxane elastomers used may contain thermally stable fillers which are conventionally used for the strengthening of polyorganosiloxanes. The greatest strengthening effect is achieved with silicic acids which have been pyrogenically obtained in the gaseous phase and have surface areas of between 50 and 400 sq. m./g. Precipitated silicic acids can also be used but they are less effective. Other suitable fillers include zinc oxide, calcium carbonate, titanium oxides, diatomaceous earth, ground quartz and fibrous asbestos. For every 100 parts of polyorganosiloxane there may be admixed 5 to 200 parts, preferably 10 to 80 parts, of filler. The addition of a dispersing substance, such as e.g. diphenylsilanediol, may be advisable in the case of strengthening fillers.

The cerium carbonate used according to the invention as an inhibitor of air vulcanisation of polyorganosiloxanes can be added in any way to the polysiloxane or to mixtures of the polysiloxane with strengthening or non-strengthening fillers or also with plasticising components or other additives. A suitable hardening agent can be added at any time during the mixing of the components; if, however, mixing is carried out in a temperature range where the hardeners may already react, then it is necessary to add the cerium carbonate before the hardener; the preparation of a preliminary mixture may be necessary. Although, in principle, the cerium carbonate can be added at any point of the mixing operation, it is advisable first to mix the cerium carbonate with the filler then mix this mixture with the polymer.

In order to achieve a substantially improved stability to hot air, at least 0.001 part cerium carbonate must be added for every 100 parts polyorganosiloxane. Additions of the order of magnitude of 0.1 to 10 percent by weight are particularly advantageous; amounts of more than 10 percent by weight do not lead to further improvements. In order to convert the cerium carbonate into an especially reactive form, it is recommended to carry out a grinding operation thereon before the addition so that its particle size is below 10 micron.

The materials obtained according to the process of the invention can be used in all technical fields of application known for silicone elastomers, particularly in the case where high demands are made on the thermal stability of the products.

The following examples are given for the purpose of illustrating the invention (all parts are by weight).

EXAMPLE 1

100 parts of a copolymer made from 0.175% by weight vinyl-methyl-siloxane and 99.825% by weight dimethyl-siloxane, whose terminal groups consisted at both ends of trimethylsiloxyl groups, were intimately mixed with 10 parts of a silicic acid pyrogenically obtained in the gaseous phase, and with cerium carbonate. A sample without cerium was prepared for comparison. Both test pieces were exposed in a stove to hot air at 250° C. for a prolonged period of time, and the hardness (Shore hardness A according to DIN 53,505) was measured after the periods of time specified in the table.

| Addition of Ce carbonate (referred to parts Ce) | Shore hardness A after — | | | |
|---|---|---|---|---|
| | 24 hours | 10 days | 18 days | 19 days |
| 0 | 15 | 70 | >80 | >80 |
| 0.82 | 0 | 0 | 0 | 2 |

EXAMPLE 2

This example demonstrates the behaviour of the tear propagation resistance according to DIN 53,515 (Graves structure), the residual compression set according to DIN 53,517 (Shore hardness A) and the hardness of a polyorganosiloxane which has been cross-linked with peroxide and to which cerium carbonate has been added, and, for comparison, a polyorganosiloxane to which no cerium carbonate has been added, and a polyorganosiloxane to which cerium dioxide has been added.

In a heated twin roll mill initially at 160° C. there were first prepared three preliminary mixtures each consisting of 100 parts of a copolymer made from 84.88% by weight dimethyl-siloxane, 15% by weight diphenyl-siloxane and 0.12% by weight allyl-methyl-siloxane, the terminal groups of which consisted at both ends of diallyl-methyl-siloxyl groups, with a viscosity (at 20° C.) of $1.3 \cdot 10^5$ p., 35 parts of a silicic acid pyrogenically obtained in the gaseous phase, 5 parts of a mixture of 50% by weight of a hydrolysed diphenyl-dichlorosilane and 50% by weight of a polydimethylsiloxane with a viscosity (at 20° C.) of $1.3 \cdot 10^5$ p., and 0.98 part cerium in the form of cerium carbonate in the case of sample B, 0.98 part cerium in the form of cerium dioxide in the case of sample C, and no cerium in the case of sample A. 0.2% by weight dicumyl peroxide was added at 40° C. after re-plasticising. The formed bodies were vulcanised at 170° C. under equivalent pressure for 10 minutes and were then tempered at 200° C. with a supply of hot air. After pressure vulcanisation at 170° C. for 10 minutes and subsequent storage in hot air at 200° C. for 6 hours and 10 days, respectively, the following values were measured for the tear propagation resistance (Graves structure as kp./cm.), residual compression set (percent) and hardness (Shore A):

Vulcanisation conditions: 10 minutes at 170° C.; pressure vulcanisation

| | Sample A | Sample B | Sample C |
|---|---|---|---|
| Graves structure | 25 | 21 | 18 |
| Compression set | 46 | 30 | 41 |
| Hardness | 33 | 36 | 33 |

Vulcanisation conditions: 10 minutes at 170° C.; pressure vulcanisation followed by 6 hours storage in hot air at 200° C.

| | | | |
|---|---|---|---|
| Graves structure | 26 | 18 | 26 |
| Compression set | 21 | 13 | 20 |
| Hardness | 40 | 39 | 39 |

Vulcanisation conditions: 10 minutes at 170° C.; pressure vulcanisation followed by 10 days storage in hot air at 200° C.

| | | | |
|---|---|---|---|
| Graves structure | 6 | 16 | 9 |
| Hardness | 48 | 42 | 45 |

EXAMPLE 3

A number of compositions were prepared from 100 parts by weight of the copolymer described in Example 1, 30 parts by weight of a silicic acid which had been pyrogenically prepared and whose surface area amounted to 300 sq. m./g., 5 parts by weight diphenyl-silane-diol, 0.6 part by weight dicumyl peroxide and, respectively, the cerium compounds mentioned below. On account of the different cerium contents of these compounds the added amounts were so chosen that all of them corresponded to a content of 0.6 part by weight of elementary cerium.

Vulcanisation was carried out at 170° C. for 10 minutes in a press; the stability to hot air was evaluated after an ageing period of 10 days at 200° C.

Vulcanisation: 10 minutes at 170° C.

| | Without Ce | Ce octoate | Ce dioxide | Ce carbonate | Ce chloride |
|---|---|---|---|---|---|
| Tensile strength (kp./sq. cm.) | 70 | 56 | 72 | 76 | |
| Elongation (percent) | 860 | 890 | 830 | 780 | |
| Hardness (Shore A) | 30 | 30 | 30 | 35 | No vulcanisation. |
| Shock elasticity (percent) | 28 | 23 | 27 | 30 | |
| Compression set (percent) | 55 | 68 | 55 | 33 | |
| Graves structure (kp./cm.) | 22 | 18 | 18 | 24 | |

Ageing: 10 days at 200° C.

| | | | | | |
|---|---|---|---|---|---|
| Tensile strength (kp./sq. cm.) | 42 | 48 | 46 | 62 | |
| Elongation (percent) | 570 | 500 | 560 | 560 | |
| Hardness (Shore A) | 45 | 45 | 45 | 45 | No vulcanisation. |
| Shock elasticity (percent) | 30 | 23 | 30 | 35 | |
| Graves structure (kp./cm.) | 15 | 16 | 16 | 22 | |

(the tensile strength and the elongation correspond to DIN 53,504)

What is claimed is:

1. In the process of producing solid, elastic polyorganosiloxane polymer which comprises organic peroxide vulcanizing or cold curing a polyorgano-siloxane polymer having 1.97 to 2.02 substituents per silicon atom, which substituents are selected from the group consisting of monovalent hydrocarbon radicals, monvalent halogenated hydrocarbon radicals, monovalent cyanohydrocarbon radicals and hydrogen; and curing and heat vulcanizing said polyorgano-siloxane polymer to a solid, elastic state, the improvement whereby reducing the curing time and increasing the thermal stability of the cured product, which comprises admixing 0.001 to 10 parts by weight of cerium carbonate per hundred parts by weight of uncured polyorgano-siloxane polymer with said uncured polymer and then curing said mixture.

2. The improved process claimed in claim 1 including admixing said cerium carbonate with a thermally stable filler and then adding said admixture to said uncured polyorgano-siloxane polymer.

3. The improved process claimed in claim 2 including using 5 to 200 parts by weight of said filler per hundred parts by weight of said uncured polymer.

4. The improved process claimed in claim 3 including using 10 to 80 parts by weight of said filler per hundred parts by weight of said uncured polymer.

5. The improved process claimed in claim 1 including using 0.1 to 10 parts by weight of cerium carbonate per hundred parts by weight of uncured polymer.

6. A mixture of 100 parts by weight of uncured polyorgano-siloxane polymer having 1.98 to 2.02 substituents per silicon atom which substituents are selected from the group consisting of monovalent hydrocarbon radicals, monovalent halogenated hydrocarbon radicals, monovalent cyanohydrocarbon radicals and hydrogen; 0.001 to 10 parts by weight of cerium carbonate; and a vulcanizing agent.

7. A mixture as claimed in claim 6 wherein said organic radical, said halo organic radical and said cyano organic radical is selected from the group consisting of methyl, chloro methyl, ethyl, cyano ethyl, propyl, cyano propyl, 3,3,3 - trifluoropropyl, isopropyl, n - butyl, tert - butyl, phenyl, chlorophenyl, perchlorophenyl, tolyl, xylyl, benzyl, phenylethyl, naphthyl, anthryl, cyclopentyl, cyclohexyl, cyclooctyl, vinyl, allyl, styryl, cyclohexenyl and cycloheptadienyl.

8. A mixture as claimed in claim 7 wherein said polymer has terminal groups selected from the group consisting of hydroxyl, alkoxyl, aroxyl, trialkyl, dialkylhydrogen, dialkylaryl, alkyldiaryl, diarylhydrogen, triaryl, dialkylalkenyl, alkyldialkenyl, trialkenyl, diarylalkenyl, and aryldialkenyl.

9. A mixture as claimed in claim 6, wherein said vulcanizing and curing agent is selected from the group consisting of dibenzoyl peroxide, di-p-chlorobenzoyl peroxide, bis(2,4-dichlorobenzoyl) peroxide, dicumyl peroxide, di-tert.-butyl peroxide, tert.-butyl per benzoate and tert.-butyl peracetate.

10. A mixture as claimed in claim 6 additionally containing 5 to 200 parts by weight of a thermally stable filler.

11. A mixture as claimed in claim 10 wherein said filler is selected from the group consisting of zinc oxide, calcium carbonate, titanium oxides, diatomaceous earth, ground quartz and asbestos.

12. A mixture as claimed in claim 6 wherein said cerium carbonate has a particle size below 10 microns and said uncured polymer has a viscosity of at least 10 cp. at 20° C.

References Cited
UNITED STATES PATENTS

| | | | |
|---|---|---|---|
| 2,999,076 | 9/1961 | Talcott | 260—18 |
| 3,142,655 | 7/1964 | Bobear | 260—37 |

DONALD E. CZAJA, Primary Examiner

M. I. MARQUIS, Assistant Examiner

U.S. Cl. X.R.

260—45.75 R, 46.5 U, 46.5 G